Patsy K. Creason, Sr.
Kelly J. Creason, Jr.
INVENTORS

United States Patent Office 2,997,804
Patented Aug. 29, 1961

2,997,804
FISHING LURE
Patsy K. Creason, Sr., and Kelly J. Creason, Jr., both of 1310 W. High St., Jefferson, Mo.
Filed Mar. 30, 1960, Ser. No. 18,749
5 Claims. (Cl. 43—42.06)

The present invention relates to a fishing lure which is expressly, but not necessarily, constructed and adapted to catch game fish, the same being designed to be used with a spinning rod and reel assembly.

Briefly, the preferred embodiment of the invention is characterized by forward and rearward companion units having adjacent end portions thereof swivelly joined together, said rearward unit embodying a spinning plug having surface-attached rudder-like lengthwise impeller fins, the trailing end of said plug having fish hooks secured rigidly thereto, and said forward unit having bait carrying means thereon.

One improvement has to do with a V-shaped fork at the trailing end of the plug or body, there being two fish hooks, the shank of one hook being axially embedded in one arm and the shank of the other hook being likewise axially embedded in another arm, whereby the hooks are poised in spaced rearwardly divergent relationship, said forward unit having bait holding means. More particularly, this means comprises an open-ended tube, the tube providing a chamber for a charge of so-called spillable fish bait.

Another improvement resides in having the forward portions of the fins joined to the plug body at diametrically opposite places. The median and rearward portions of the fins are directed at oblique angles relative to the turning axis of the plug and one terminal end is deflected to the right and the other to the left and the terminal ends project rearwardly of the barbed points of their respective hooks. These terminal ends are spaced from the barbed hooks lengthwise to provide clearance between the barbs and the adjacent edges or ends of said terminal ends.

A further improvement pertains to a lure characterized by a piloting and steering unit embodying a horizontal plate serving as a plane, a vertical stabilizer carried by the leading end of said plate, said stabilizer embodying rearwardly divergent coplanar spaced vanes, one located above and one below said plate, and a spinning plug having impelling fins and attached fish hooks, said plug having its leading end swivelly connected to the trailing end of said plate.

In carrying out a preferred embodiment of the construction just described it will be noted that the tubular open-ended bait holder or chumming tube is fixed on the trailing end of the plate. This plate, which functions as a sort of a supporting plane, is flat-faced and triangular in plan. The stabilizer which cooperates with the vertex or leading end thereof is V-shaped in side elevation, resembling a wishbone.

One embodiment includes the utilization of a plurality of tubular bait holders. Each holder comprises an open-ended tube. While one tube is fixed to the trailing end of the above-named plate, two additional tubes are provided and they are affixed to each other at right angles and the forward one is swivelly connected to the tube or bait holder on the plate and the rear one is swivelly connected to a suitable shank to the leading end of the spinning plug. By leaving the tubes empty they function as water agitating barrels with the result that the overall lure is animated and the turbulency of the water attracts fish to the lure to be caught thereby.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
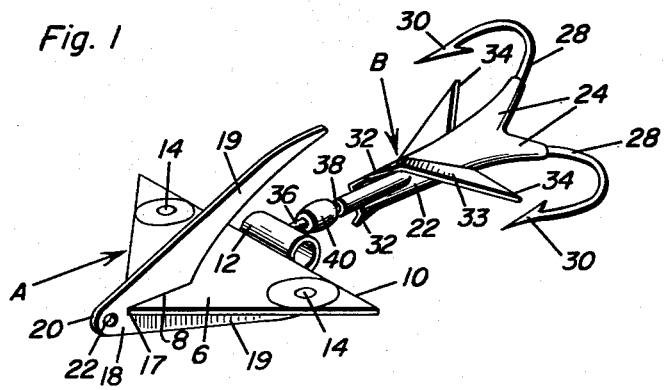
FIG. 1 is a view in persepctive of a fishing lure constructed in accordance with the principles of the present invention.

With reference to the views of the drawings, it will be seen that the forward unit is designated generally at A, the rearward unit at B, and the intervening swivelling and connecting means (FIGS. 2, 3 and 4) at C.

The forward unit A constitutes a bait carrier. But more specifically, it constitutes a piloting, steering and stabilizing device or unit. It comprises a horizontal planar plate 6. This plate is preferably triangular in plan and is positioned so that the apical end or vertex 8 is the leading end and the rear straight across base or edge 10 is the trailing end. One of the aforementioned bait holding or chumming tubes is denoted at 12 and comprises a short open-ended tube which is fixed lengthwise to the median part of the trailing edge or end 10. The inner and outer circles depicted at the respective corner portions, as at 14, constitute imitation eyes. The complemental vertical guide and stabilizer 16 is (see FIG. 3) V-shaped in side elevation. It is alternatively referred to as wishbone-like and embodies upper and lower rearwardly diverging vanes 19. The forward end portion 18 has a notch 17 therein into which the cooperating apical end portion of the plate is fitted and secured. The blunt terminal or nose 20 is provided with a hole 22 to accommodate a suitable swivel (not shown) to which a fishing line may be connected.

Taking up now the spinner or spinning unit B, this comprises a suitably elongated body or plug 22. The rear end portion thereof is fashioned to form a V-shaped fork. The fork embodies a pair of divergent arms 24 in which the two fish hooks 25 are respectively mounted, as illustrated. More specifically, the shank 28 of each fish hook is axially aligned with and embedded in a cooperating arm 24. The barbed or pointed end 30 is directed forwardly toward and beyond the crotch portion of the fork. The body is also provided with a pair of duplicate diametrically opposite fins. Each fin is of blade or rudder-like form. The forward end portion 32 is fixed to a surface of the body and the median portions 33 are directed diagonally to the left and right of the axial center and the tapering terminal ends 34 project in a manner that they are lined up with their respective cooperating barbed hooks. The end portions 34 are not only aligned with the respective barbs 30, they are spaced from the barbs. More specifically, the ends or terminals 34 project rearwardly of the pointed ends of the barbs and the edge portions are spaced from the barbs to provide the desired clearance for securely holding a caught fish.

Figure 2:
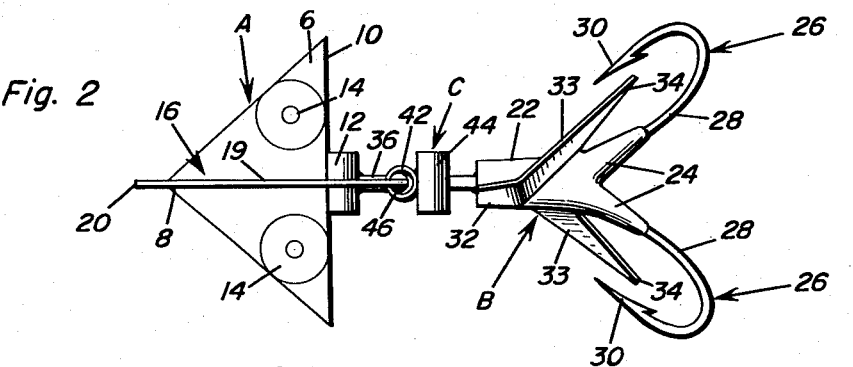
FIG. 2 is a top plan view of a modified form of the invention.

As is evident from FIGS. 1 and 2, it is within the purview of the invention to employ one or more tubular bait holders or chumming tubes. With respect to FIG. 1, the rearwardly extending shank 36 carried by the tube 12 is connected to the complemental forwardly extending shank 38 on plug 22 by an intervening suitably constructed, swivel 40.

Figure 3:
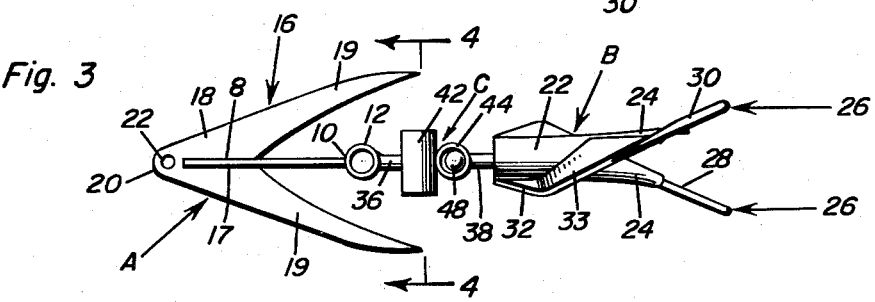
FIG. 3 is a side elevation of the lure shown in FIG. 2.
Figure 4:
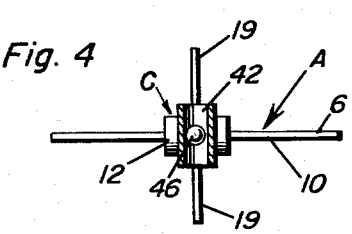
FIG. 4 is a section on the vertical line 4—4 of FIG. 3, looking in the direction of the arrows.

In the adaptation seen in FIGS. 2 to 4 two additional bait holders are provided. Each chumming tube or bait holder comprises an open-ended tube which is relatively short. One tube is denoted by the numeral 42 and the other one by the numeral 44 and both tubes have adjacent surfaces welded or otherwise joined together in right angular relationship. The swivel connections are denoted at 46 (FIG. 4) and 48 (FIG. 3), respectively.

Each bait holder or carrier defines a small chamber which may be baited. Each tube is open at both ends so that when the plug is retrieved through the water, the water will wash the soluble bait from the chambers back over the plug to entice the fish to follow in the path the plug has just traveled, at the same time giving the fish a scent that will entice it toward the lure. This scent induces the fish to strike the hook-equipped plug and thus be caught.

The line (not shown) fastens in the small hole on the extreme front end. This lure may be used as a deep runner with a slow retrieve. Also, a top runner with a fast retrieve. The bait holders or tubes are loaded with a bait bait edible food, emulsified in butter-like form with a very strong odor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing lure comprising, a piloting and steering unit embodying a plate having leading and trailing ends and serving as a plane, a stabilizer carried by the leading end of said plate, said stabilizer embodying rearwardly divergent coplanar spaced vanes, one vane being located above and one vane below said plate, a spinning plug having impelling fins and attached fish hooks, said plate being flat-faced, triangular in plan and the vertex constituting the leading end, said stabilizer being V-shaped in side elevation, an open-ended chumming tube fixed horizontally to a median portion of the edge at the rear end of said plate, and a pair of additional open-ended chumming tubes fixed at right angles to each other, one of said additional tubes being swivelly joined to said first-named chumming tube and the other one of said additional tubes being swivelly joined to the leading end of said plug.

2. A fishing lure comprising a piloting and steering unit embodying a planar plate having leading and trailing ends and, a stabilizer fixed to the leading end of said plate, said stabilizer embodying rearwardly divergent coplanar spaced vanes disposed in a plane at right angles to the plane of said plate, one vane being located above and one vane below said plate, a tube having an unobstructed open bore, a surface of said tube being fixed to a median portion of the trailing end of said plate, said tube having a rearwardly projecting shank, a spinning plug having impelling fins and attached fish hooks cooperating with said fins, said plug having its leading end provided with a shank aligned with said first mentioned shank and swivelly connected with said first mentioned shank.

3. A fishing lure comprising a piloting and steering unit embodying a horizontal plate having leading and trailing ends and serving as a plane, a vertical stabilizer carried by the leading end of said plate, said stabilizer embodying rearwardly divergent coplanar spaced vanes, one vane located above and one vane below said plate, a spinning plug having impelling fins and attached fish hooks, an open-ended chumming tube fixed on the trailing end of said plate, and a pair of additional tubular open-ended tubes fixed together in right angular relationship and swivelly joined to said chumming tube and also swivelly joined to the leading end of said spinning plug.

4. A fishing lure comprising, in combination, a piloting and steering unit embodying a horizontal planar plate having leading and trailing ends and triangular in plan constituting a plane, a vertical stabilizer carried by the leading end of said plate, said stabilizer being V-shaped in side elevation and embodying rearwardly divergent coplanar spaced vanes at right angles to said plate, one vane located above and one vane below said plate, a spinning plug having fixed impelling fins and fixedly attached fish hooks, a tubular open-ended bait holder of a length less than and fixed to a median portion of the rear edge of said plate, said tubular member having a lateral rearwardly projecting shank, said plug being provided at its leading end with a similar shank axially alined with the first named shank, and means swivelly joining adjacent ends of said shanks.

5. The structure defined in claim 4, and wherein said means embodies at least one tubular member similar to said first mentioned tubular member.

References Cited in the file of this patent

UNITED STATES PATENTS

| | | |
|---|---|---|
| 261,194 | Wylly | July 18, 1882 |
| 570,632 | Hastings | Nov. 2, 1896 |
| 1,870,559 | Drake | Aug. 9, 1932 |
| 2,585,494 | Pelto | Feb. 12, 1952 |
| 2,588,300 | Smith | Mar. 4, 1952 |

FOREIGN PATENTS

| | | |
|---|---|---|
| 507,788 | France | July 5, 1920 |